Oct. 26, 1948.　　　F. H. JANTZEN　　　2,452,241
MEASURING IMPLEMENT
Filed May 13, 1944
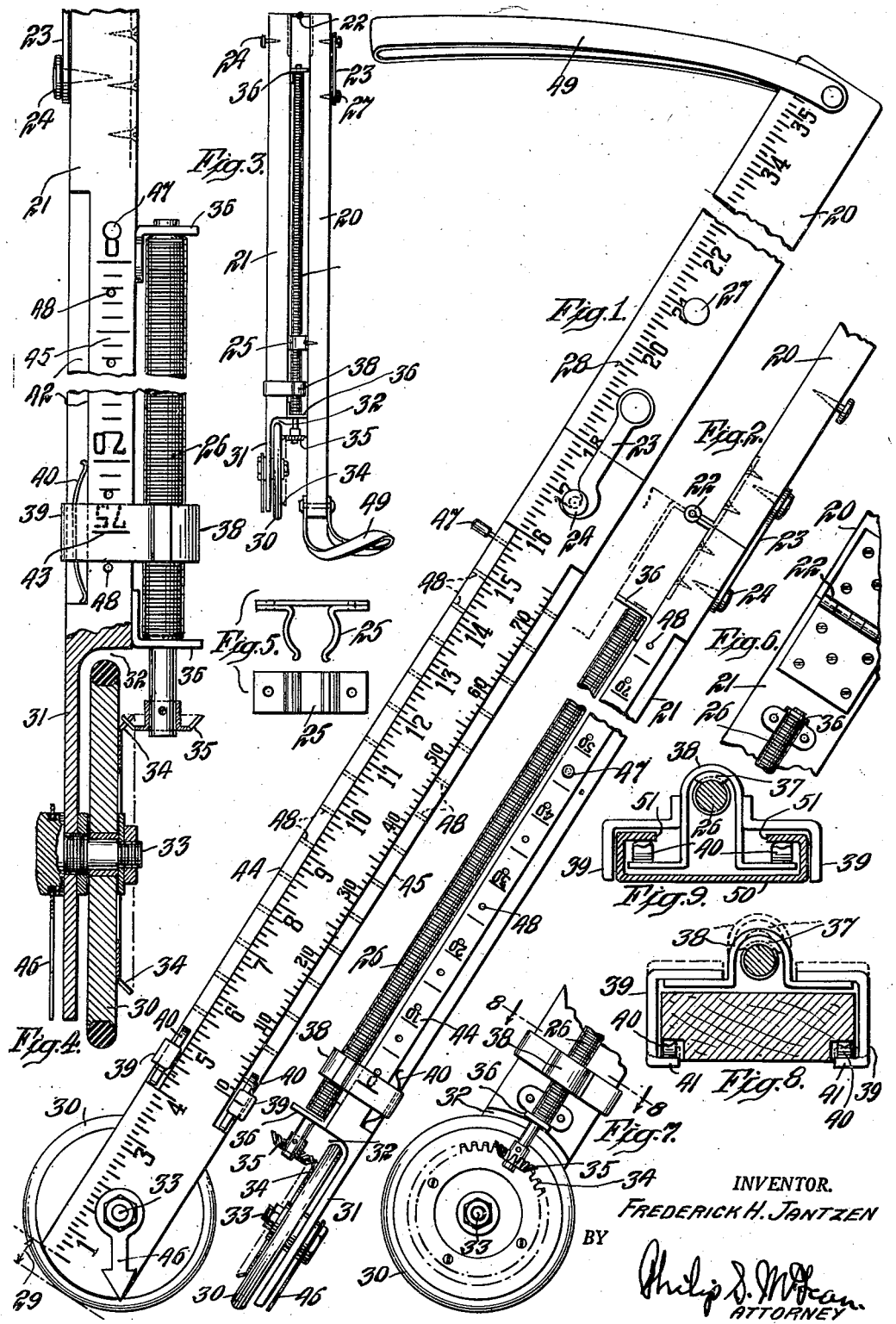
INVENTOR.
FREDERICK H. JANTZEN
BY
ATTORNEY Patented Oct. 26, 1948

2,452,241

UNITED STATES PATENT OFFICE 2,452,241

MEASURING IMPLEMENT

Frederick H. Jantzen, Bronx, N. Y., assignor of fifty per cent to Maxwell R. Ginsberg Application May 13, 1944, Serial No. 535,517

3 Claims. (Cl. 33—141)

The invention herein disclosed relates to apparatus for measuring linear distance.

Special objects of the invention are to enable the measurement of surfaces and objects such as floors, walls, ceilings and the like, by the simple act of running a wheel over the surface, and to provide a device of this type which will be in the nature of a cane or walking stick, convenient and practical for carrying and using.

Further important objects are to provide the device in a form which may be used for measuring short lengths, after the manner of a yardstick, or be used for measuring continuous, unlimited distances.

A special object of the invention, for such uses as measuring distance between two points, is to facilitate the starting and the stopping of the measuring wheel at the right places to obtain accurate results.

Further objects of the invention are to provide an implement of the character outlined, which will be of particularly simple and inexpensive construction.

Other desirable objects and the novel features by which the purposes of the invention are attained, will appear or are set forth in the following specification.

In the drawings accompanying and forming part of the specification, certain practical forms of the invention are illustrated, but it is realized that structure may be further modified and changed all within the true intent and broad scope of the invention as hereinafter defined and claimed.

Fig. 1 in the drawings is a broken side elevation of a "yardstick" type of embodiment of the invention.

Fig. 2 is a broken part sectional edge or plan view of the same, with dotted lines indicating the hinging or folding action.

Fig. 3 is an edge view showing the device completely folded.

Fig. 4 is an enlarged broken edge view partly in section.

Fig. 5 is an edge and plan view of the clip for holding the handle folded in closed position.

Fig. 7 is an elevation looking at the opposite side of the stick from that appearing in Fig. 1.

Fig. 8 is an enlarged cross-sectional view on substantially the plane of line 8—8 of Fig. 7.

Fig. 9 is a similar view of a modification employing a metal channel form of stick.

In the first embodiment of the invention illustrated, Figs. 1 to 8, the elongated handle portion of the device is in the nature of a flat yardstick, comprising upper and lower sections 20, 21, connected together by an offset hinge 22, so that they may be folded one over the other in close substantially parallel relation as indicated in Fig. 3.

A hook 23, pivoted on one section and engaging a headed stud 24, on the other section serves to hold the two in the rigidly extended relation shown in Figs. 1 and 2, and a spring clip 25, Fig. 5, carried by the upper section and engageable about a screw shaft 26, on the lower section serves to yieldingly retain the sections in the folded relation indicated in Fig. 3. In the latter position, the pivoted hook may be swung into holding engagement with a retainer stud 27, on the same handle section on which it is pivoted.

As shown particularly in Fig. 1, the extended handle carries a yardstick scale 28, but this scale differs from the conventional in that it is short at the lower, initial end, an amount 29, equivalent to the extent that the measuring wheel 30, projects beyond the end of the stick. This makes the extending rim of the wheel an actual part of the scale, enabling the yardstick to be used by placing the wheel up against an object from which a measurement is to be taken and leaves the end of the stick back from the rim of the wheel where it will be clear of a floor or other surface over which the wheel may be run.

The lower end of the stick, in back of the scale 28, is shown as thinned down at 31, providing a recess 32, partly housing the wheel and bringing the projecting rim portion as nearly as possible in a plane with the face of the scale.

The wheel is shown journalled on a fixed stud 33, secured in the reduced end portion of the stick and as carrying on its exposed face, a gear 34, approximately flush with the back face of the stick and in position to mesh with a pinion 35, on the lower end of the screw shaft 26.

The screw shaft 26, is shown journalled in brackets 36, close to the face of the supporting stick and as engaged by a nut element 37, within the arched portion of a bracket 38, embracing the shaft and carrying at opposite ends the angled indicator elements 39, slidingly embracing the opposite edge portions of the stick. Bowed springs 40, engaged beneath the inwardly angled ends 41, of these indicators and riding in the rabbeted or channeled edge portions 42, of the stick yieldingly hold the rider 38, in mesh with the screw shaft. The dotted lines in Fig. 8 show how the indicator portions 39, may be gripped between a thumb and finger and thrust back against the tension of springs 40, to clear the nut element from the screw shaft and permit the indicator to be slid back to a starting point or other desired position.

Figs. 1, 2 and 4 show how the finger grip indicator elements 39, may be of transparent material and have index lines 43, to register on the scales 44, 45, on the opposite edge portions of the lower half of the stick.

One of these edge scales, which for general computing purposes, are usually laid off in feet, may start at the lower end, as in Fig. 2, and the other start at the upper end as in Fig. 4, thus to enable continuous measurements to be made, without resetting the indicator, by pushing the wheel along until one full scale is covered and then turning the device over to bring the other scale uppermost and continuing the motion in the same direction. By reason of the reversibility of the gearing, the indicator will then be driven up one scale and then down the other scale and the distance of one scale can thus be added to the other indefinitely. In shifting from one scale to the other, the wheel may be left in contact with the floor and simply be rotated about the point of contact as an axis so as not to introduce any inaccuracy in the total measurement.

The size of the wheel, ratio of gearing and pitch of the screw thread determines the rate of movement of the indicator to the travel of the wheel. For general purposes, proportions such as illustrated have been found practical, the lower half of a handle of yardstick length providing sufficient travel for easily read scales representing for instance 75 to 100 feet or more.

The wheel may be rubber-tired to afford non-slipping engagement with different floor surfaces, walls, ceilings and other objects. To provide a smooth, quiet, running engagement between the screw shaft and indicator, the nut element may be in the form of a block of rubber, either impressed with screw threads or taking its screw threads from the spring pressure by which it is held engaged with the screw threads of the shaft. This also has the advantage of providing a frictional, coupling between the shaft and indicator, tending to hold the parts in the position they occupied when the device is lifted up from engagement with the floor, for example, to more closely read the scale.

To facilitate positioning of the wheel for accurate measurements, a freely suspended pointer 46, is shown pivotally hung on the pivot stud 33, of the wheel, over the face of the yardstick scale, where it will hang down to show the exact line of contact and hence the exact line of starting or finishing a measurement with the wheel.

As an aid to laying off measurements of predetermined length, one or more cautionary or warning indicators may be provided in the form of indicator pins 47, which can be set in holes 48, at different points in the length of the scales 44, 45. For example, if a distance of 50 feet is to be laid off, the cautionary pin 47, may be inserted in the 45 foot positioning hole as in Fig. 2, so that as the user sees the indicator approaching this pin, he will be warned that he is reaching the 50 foot position and can watch more closely or observe other precautionary steps. The stem portions of these indicator pins may be split or the parts be otherwise fashioned to frictionally hold in place and avoid loss.

For convenience, the stick may have a suitable carrying handle, such as a crook to be hooked over the arm or a wrist loop such as indicated at 49, Fig. 1.

The cane or stick portion of the device may be of wood, metal, plastic or other materials. In the first embodiment, it is indicated as made of wood.

In a second embodiment, the body of the stick is shown in the form of a metal channel 50. This may be in hinged sections, as first disclosed. The channel form provides desired rigidity with lightness in weight. The edges of the channel are shown turned inward as flanges 51, to confine and form abutment slide surfaces for the bowed indicator springs 40. In this construction, the main portions of the rider may be received and housed within the channel of the handle or stick.

If motion is continued after the rider engages the stop, no injury will be occasioned, since the rider is yieldingly pressed against the screw shaft by spring 40 which permits the rider to snap over the screw threads of the shaft, producing a clicking sound, serving as an audible warning or indication.

What is claimed is:

1. A linear measuring implement, comprising a long handle in hingedly connected sections foldable one over the other, a measuring wheel journalled at the free end of one of said handle sections, a longitudinally extending screw shaft located to one side of said one handle section and journalled at both ends on said handle section and operated by said measuring wheel, an indicator operated by said screw shaft, said measuring wheel, indicator and screw shaft being so constructed and arranged as to be located between and be protected by said handle sections when they are folded together, means for releasably retaining said hingedly connected handle sections in said thus folded condition and means for rigidly holding the hinged handle sections in extended relation.

2. A linear measuring implement, comprising a long handle having first and second sections, a hinge fastened to the adjacent ends of said two sections and enabling said sections to be folded one over the other, a measuring wheel journalled at the free end of said first handle section, a threaded shaft extending parallel to said handle and journalled at both ends on said first handle section and operated by said measuring wheel, said shaft in the extended position of said handle being accessible over its entire threaded length from that side of said first sction which is adjacent the second section when said handle sections are folded together, an indicator operated by said threaded shaft, said second handle section having such length that it protects said indicator and shaft when the sections are folded together, means for releasably retaining said hingedly connected handle sections in said folded condition, and means for rigidly holding the hinged handle sections in extended relation.

3. A collapsible linear measuring implement, comprising a long handle having first and second sections arranged along the same longitudinal axis, means enabling said sections to be moved one over the other for collapsing into a compact condition, a measuring wheel journalled at the free end of said first handle section, a threaded shaft extending parallel to said handle and journalled at both ends on said first handle section and operated by said measuring wheel, said shaft in the extended position of said handle being accessible over its entire threaded length from that side of said first section which is adapted to be adjacent the second section when said handle sections are collapsed, an indicator operated by said threaded shaft, said second handle section having such length that it protects said indicator and shaft when the sections are collapsed, means for releasably retaining said handle sections in collapsed condition, and means for rigidly holding the handle sections in extended relation.

FREDERICK H. JANTZEN.

REFERENCES CITED

The following references are of record in the file of this patent:

UNITED STATES PATENTS

| Number | Name | Date |
|---|---|---|
| 43,789 | Olds | Aug. 9, 1864 |
| 49,011 | Tiffany | July 25, 1865 |
| 399,966 | Buchanan | Mar. 19, 1889 |
| 435,012 | Calkins | Aug. 26, 1890 |
| 997,648 | Cavanagh et al. | July 11, 1911 |
| 1,258,426 | Mackintosh | Mar. 5, 1918 |
| 2,188,201 | Diedrich | Jan. 23, 1940 |

FOREIGN PATENTS

| Number | Country | Date |
|---|---|---|
| 17,840 | Great Britain | 1888 |
| 20,571 | France | Apr. 6, 1918 |
| 464,911 | France | Jan. 24, 1914 |